US010775797B2

(12) United States Patent
Zhao et al.

(10) Patent No.: US 10,775,797 B2
(45) Date of Patent: Sep. 15, 2020

(54) METHOD AND DEVICE FOR MOBILE ROBOT TO MOVE IN PROXIMITY TO OBSTACLE

(71) Applicant: Shanghai SLAMTEC Co., Ltd., Pudong District, Shanghai (CN)

(72) Inventors: Yonghua Zhao, Shanghai (CN); Jing Bai, Shanghai (CN); Yuxiang Li, Shanghai (CN)

(73) Assignee: Shanghai SLAMTEC Co., Ltd., Shanghai (CN)

( * ) Notice: Subject to any disclaimer, the term of this patent is extended or adjusted under 35 U.S.C. 154(b) by 377 days.

(21) Appl. No.: 15/869,430

(22) Filed: Jan. 12, 2018

(65) Prior Publication Data

US 2019/0121360 A1 Apr. 25, 2019

(30) Foreign Application Priority Data

Oct. 25, 2017 (CN) .......................... 2017 1 1006125

(51) Int. Cl.
*G05D 1/02* (2020.01)
*G01S 17/931* (2020.01)

(52) U.S. Cl.
CPC .......... *G05D 1/0214* (2013.01); *G01S 17/931* (2020.01); *G05D 1/024* (2013.01); *G05D 1/0223* (2013.01); *G05D 2201/0203* (2013.01); *Y10S 901/01* (2013.01)

(58) Field of Classification Search
CPC .... G05D 1/0214; G05D 1/024; G05D 1/0223; G05D 1/0236; G05D 1/0257; G05D 1/0263; G05D 1/0276; G01S 17/931; Y10S 901/01
USPC ........................................................... 701/23
See application file for complete search history.

(56) References Cited

U.S. PATENT DOCUMENTS

2010/0121517 A1* 5/2010 Lee ...................... G05D 1/0214
701/25
2014/0283326 A1* 9/2014 Song .................. A47L 11/4041
15/319

FOREIGN PATENT DOCUMENTS

| | | | |
|---|---|---|---|
| CN | 101825901 | A | 9/2010 |
| CN | 107041718 | A | 8/2017 |
| EP | 2251758 | A1 | 11/2010 |
| EP | 3059650 | A1 | 8/2016 |
| WO | 2017050358 | A1 | 3/2017 |

* cited by examiner

*Primary Examiner* — Marthe Y Marc-Coleman
(74) *Attorney, Agent, or Firm* — Sandberg Phoenix & von Gontard PC

(57) ABSTRACT

A method and a device are provided for a mobile robot to move in proximity to an obstacle. In the method, the mobile robot moves at a preset speed in a preset direction when it is detected that a distance between the mobile robot and the obstacle reaches a preset distance; a robot predicted moving space of the mobile robot in a next moving cycle is calculated based on the preset speed and the preset direction; and an adjusted speed and an adjusted direction of the mobile robot are determined based on the robot predicted moving space, so as to make the mobile robot move in proximity to the obstacle at the adjusted speed in the adjusted direction.

12 Claims, 2 Drawing Sheets

The mobile robot approaches the obstacle at a current speed in a specified direction when the distance between the mobile robot and the obstacle is greater than the preset distance — S14

The mobile robot moves at a preset speed in a preset direction when it is detected that a distance between the mobile robot and the obstacle reaches a preset distance — S11

Calculate a target geographic range of the mobile robot in a next moving cycle is calculated based on the preset speed and the preset direction — S12

Determine an adjusted speed and an adjusted direction of the mobile robot are determined based on the target geographic range — S13

METHOD AND DEVICE FOR MOBILE ROBOT TO MOVE IN PROXIMITY TO OBSTACLE

CROSS-REFERENCE TO RELATED APPLICATIONS

This application claims priority to Chinese App. No. 201711006125.5 filed on Oct. 25, 2017 which is incorporated herein by reference.

TECHNICAL FIELD

The present application relates to the field of computer techniques and, in particular, to a technique for a mobile robot to move in proximity to an obstacle.

BACKGROUND

At present, use of mobile robots is increasingly popular. In particular, domestic service robots and shopping guide robots such as sweeping robots and mopping robots bring great convenience to people's lives. However, a robot during moving will encounter obstacles, e.g., a wall. In this case, the robot needs to move in proximity to the obstacle without hitting it.

In the related art, moving in proximity to an obstacle is mainly implemented by using a known map. Such method is based on a case that there is a known map, and cannot adapt to an environmental change well, thus having a small application scope and failing to meet requirements of variable environment.

SUMMARY

An object of the present application is to provide a method for a mobile robot to move in proximity to an obstacle.

According to one aspect of the present application, a method for a mobile robot to move in proximity to an obstacle is provided. The method includes: moving, by the mobile robot, at a preset speed in a preset direction when it is detected that a distance between the mobile robot and the obstacle reaches a preset distance; calculating a robot predicted moving space of the mobile robot in a next moving cycle based on the preset speed and the preset direction; and determining an adjusted speed and an adjusted direction of the mobile robot based on the robot predicted moving space, so as to make the mobile robot move in proximity to the obstacle at the adjusted speed in the adjusted direction.

Further, before the step of moving, by the mobile robot, at the preset speed in the preset direction when it is detected that the distance between the mobile robot and the obstacle reaches the preset distance, the method further includes: approaching the obstacle at a current speed in a specified direction when the distance between the mobile robot and the obstacle is greater than the preset distance.

Further, before the step of moving, by the mobile robot, at the preset speed in the preset direction when it is detected that the distance between the mobile robot and the obstacle reaches the preset distance, the method further includes: determining, according to acquired laser data, a target position in proximity to the obstacle when the distance between the mobile robot and the obstacle is greater than the preset distance, so as to make the mobile robot move towards a direction of the target position.

Further, the target position is a position nearest to the mobile robot currently in distance.

Further, the step of determining the adjusted speed and the adjusted direction of the mobile robot based on the robot predicted moving space includes: determining, based on the robot predicted moving space, whether the obstacle is within the robot predicted moving space; and reducing, when the obstacle is within the robot predicted moving space, the preset speed by a preset speed increment and rotating by a preset angle increment according to the preset direction, so as to determine the adjusted speed and the adjusted direction.

Further, the step of determining the adjusted speed and the adjusted direction of the mobile robot based on the robot predicted moving space further includes: using the preset speed and the preset direction as the adjusted speed and the adjusted direction respectively when the obstacle is not within the robot predicted moving space.

As compared to the related art, in the present application, the mobile robot moves at a preset speed in a preset direction when it is detected that a distance between the mobile robot and the obstacle reaches a preset distance; a robot predicted moving space of the mobile robot in a next moving cycle is calculated based on the preset speed and the preset direction; and an adjusted speed and an adjusted direction of the mobile robot are determined based on the robot predicted moving space, so as to make the mobile robot move in proximity to the obstacle at the adjusted speed in the adjusted direction. By such mode, a moving mode of the mobile robot can be flexibly adjusted according to environment changes so as to prevent the mobile robot from hitting the obstacle.

BRIEF DESCRIPTION OF DRAWINGS

Other features, objects and advantages of the present disclosure will become more apparent from a detailed description of non-restrictive embodiments with reference to the accompanying drawings.

Same or similar reference numbers in the accompanying drawings denote same or similar components.

DETAILED DESCRIPTION

The present disclosure will be described below in further detail with reference to the accompanying drawings.

In a typical configuration of the present application, a terminal, a service network device and a trusted party each include one or more processors (CPUs), input/output interfaces, network interfaces and memories.

The memories may include computer-readable media like a volatile memory, a random access memory (RAM) and/or a non-volatile memory such as a read-only memory (ROM) or a flash RAM. A memory is an example of a computer-readable medium.

The computer-readable media include non-volatile, volatile, removable and immovable media. Information can be stored using any method or technology. The information may be a computer-readable instruction, a data structure, a program module or other data. Examples of computer storage media include, but are not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a magnetic-cassette mode magnetic tape, a magnetic tape or a magnetic disk or other magnetic storage devices, or any other non-transmission medium capable of storing information accessible to a computing device. As defined herein, the computer-readable media do not include non-transitory computer-readable media such as modulated data signals and carriers.

To further elaborate on the technical means adopted and the effects achieved in the present application, the solutions of the present application are clearly and completely described below with reference to the accompanying drawings and embodiments.

Figure 1A:
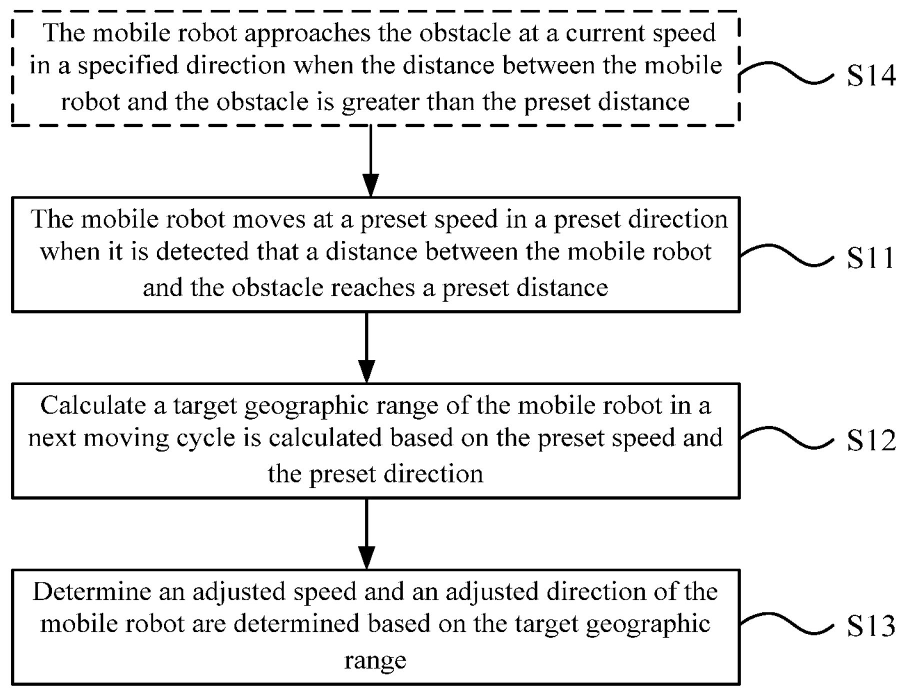
FIGS. 1A and 1B are flowcharts illustrating a method for a mobile robot to move in proximity to an obstacle according to one aspect of the present application.
Figure 1B:
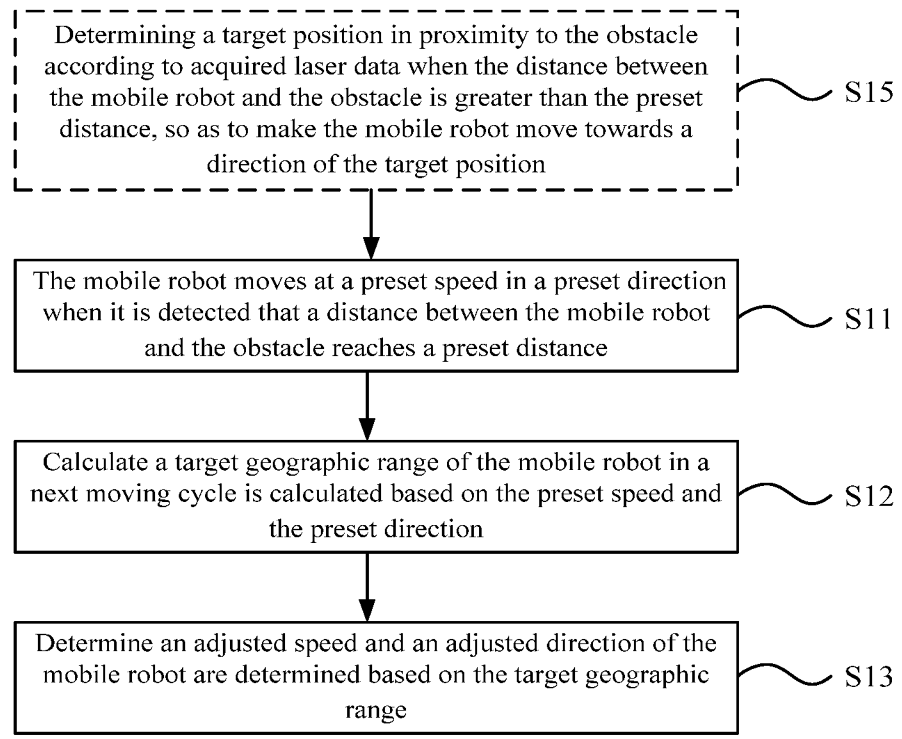

FIGS. 1A and 1B illustrate a method for a mobile robot to move in proximity to an obstacle according to one aspect of the present application. The method includes following steps.

In step S11, the mobile robot moves at a preset speed in a preset direction when it is detected that a distance between the mobile robot and the obstacle reaches a preset distance.

In step S12, a robot predicted moving space of the mobile robot in a next moving cycle is calculated based on the preset speed and the preset direction.

In step S13, an adjusted speed and an adjusted direction of the mobile robot are determined based on the robot predicted moving space, so as to make the mobile robot move in proximity to the obstacle at the adjusted speed in the adjusted direction.

In this embodiment, in the step S11, the mobile robot includes a device capable of automatically or passively controlling movement of, e.g., a sweeping robot, a mopping robot and the like; and the obstacle includes an object capable of stopping the movement of the mobile robot. Here the obstacle is an obstacle responded based on laser data.

When the mobile robot is moving, the distance between the mobile robot and the obstacle is constantly detected so as to enable the mobile robot to move along an outline of the obstacle when the mobile robot is in proximity to the obstacle. Here, ranging information with respect to the obstacle nearby may be obtained by a lidar, and the distance between the mobile robot and the obstacle may be obtained based on the ranging information. Here, the preset distance may be preset. The preset distance indicates that the mobile robot is close to but not in contact with the obstacle. A preset speed and a preset direction of the mobile robot when the mobile robot reaches the preset distance may be preset. The preset speed is an initial sampling speed of moving of the mobile robot when the mobile robot approaches the obstacle. The preset speed includes a linear speed and an angular speed. Here, it may be assumed that the mobile robot uses a largest linear speed and a largest angular speed as the preset speed. The preset direction is an initial moving direction of the mobile robot when the mobile robot approaches the obstacle. The preset direction may be preset to, e.g., leftwards or rightwards. When it is detected from an analysis of laser data that the distance between the mobile robot and the obstacle reaches the preset distance, the mobile robot moves at the preset speed in the preset direction.

Before the step S11, the method further may include a step S14 in which the mobile robot approaches the obstacle at a current speed in a specified direction when the distance between the mobile robot and the obstacle is greater than the preset distance. In this embodiment, when the mobile robot is far away from the obstacle, the mobile robot may move at its current speed in a current direction since the mobile robot will not hit the obstacle. Here, the current speed of the mobile robot may be preset, or may be a moving speed that can be automatically adjusted by the mobile robot and can be used when the mobile robot is far from the obstacle. The specified direction may include a current moving direction of the mobile robot, and may further include certain a randomly set direction.

Before the step S11, the method may further include a step S15 in which a target position in proximity to the obstacle is determined according to acquired laser data when the distance between the mobile robot and the obstacle is greater than the preset distance, so as to make the mobile robot move towards a direction of the target position.

In this embodiment, when the mobile robot is far away from the obstacle, a target position, which is a position for approaching the obstacle, is determined according to the acquired laser data. The mobile robot may adjust speed and direction according to the target position so as to approach the target position. The target position may be a position nearest to the mobile robot currently in distance, i.e., the mobile robot may approach the obstacle by moving for a shortest distance.

Still in this embodiment, in the step S12, the robot predicted moving space of the mobile robot in the next moving cycle is calculated based on the preset speed and the preset direction. Here, the moving cycle may be a preset sampling cycle. The robot predicted moving space of the mobile robot in the next moving cycle may be calculated through the sampling cycle, the preset speed and the preset direction. The robot predicted moving space is used for indicating position information of the mobile robot in the next moving cycle, and may be a position point or a position range.

Still in this embodiment, in the step S13, the adjusted speed and the adjusted direction of the mobile robot are determined based on a positional relationship between the robot predicted moving space and the obstacle, so as to make the mobile robot move in proximity to the obstacle at the adjusted speed in the adjusted direction.

The step S13 may include: determining, based on the robot predicted moving space, whether the obstacle is within the robot predicted moving space; and reducing, when the obstacle is within the robot predicted moving space, the preset speed by a preset speed increment and rotating by a preset angle increment according to the preset direction, so as to determine the adjusted speed and the adjusted direction.

In this embodiment, the acquired laser data may be used for determining the distance between the mobile robot and the obstacle and a distance of the robot predicted moving space. Here, the robot predicted moving space may be position information of a point closest to the obstacle. The distance between the mobile robot and the obstacle and the distance to the robot predicted moving space are compared to determine whether the obstacle is within the robot predicted moving space. That is, such method can be used for calculating whether the mobile robot hits the obstacle in the next moving cycle.

When the obstacle is within the robot predicted moving space, the mobile robot will hit the obstacle and thus the moving speed and direction of the mobile robot needs to be adjusted. Here, as an adjusting mode, it is feasible to reduce the preset speed by the preset speed increment and rotate by the preset angle increment according to the preset direction, so as to determine the adjusted speed and the adjusted direction. Here, the preset speed increment may be a preset adjustment amount of the speed. The adjustment amount may be fixed or may vary according to actual situations. For example, when the possibility of a collision is high, the preset speed may be reduced by a larger amount, i.e., the absolute value of the preset speed increment is large; and when the possibility of the collision is small, the preset speed may be reduced by a smaller amount, i.e., the absolute value of the preset speed increment may be small. Meanwhile, to avoid collisions, it is also needed to adjust the mobile robot leftwards or rightwards by certain preset angular increment, so as to slightly change the moving direction of the mobile robot.

The step S13 may include: using the preset speed and the preset direction as the adjusted speed and the adjusted direction respectively when the obstacle is not within the robot predicted moving space.

In this embodiment, when the mobile robot does not hit the obstacle in the next moving cycle, the mobile robot continues moving according to the preset speed and the preset direction as initially approaching the obstacle. After moving for a certain distance, a mobile robot predicted moving space in another moving cycle is further calculated according to the preceding mode, so as to enable the mobile robot to keep moving along the obstacle.

As compared to the related art, in the present application, the mobile robot moves at a preset speed in a preset direction when it is detected that a distance between the mobile robot and the obstacle reaches a preset distance; a robot predicted moving space of the mobile robot in a next moving cycle is calculated based on the preset speed and the preset direction; and an adjusted speed and an adjusted direction of the mobile robot are determined based on the robot predicted moving space, so as to make the mobile robot move in proximity to the obstacle at the adjusted speed in the adjusted direction. By such mode, a moving mode of the mobile robot can be flexibly adjusted according to environment changes so as to prevent the mobile robot from hitting the obstacle.

Figure 2:
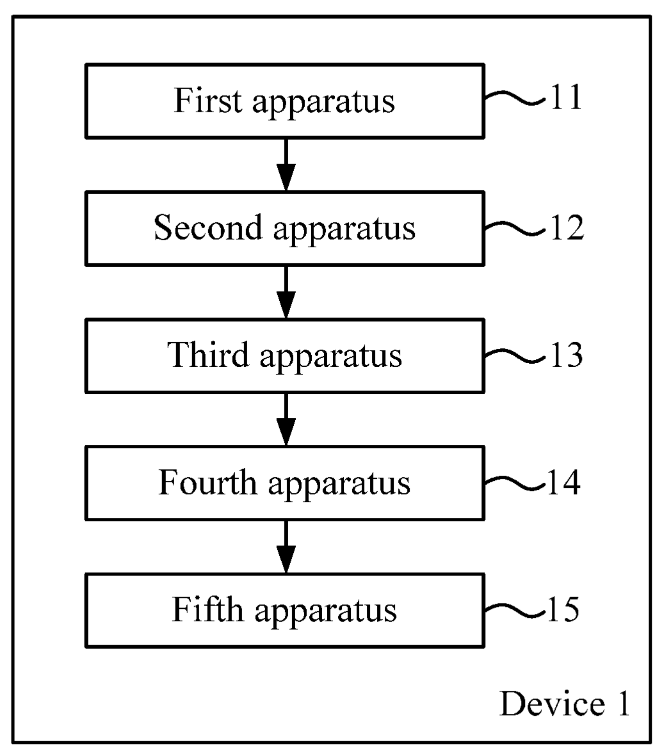
FIG. 2 is a schematic diagram illustrating a device for a mobile robot to move in proximity to an obstacle according to another aspect of the present application.

FIG. 2 illustrates a device for controlling the mobile robot to move in proximity to the obstacle according to another aspect of the present application, in which a device 1 includes following apparatuses.

A first apparatus is configured to enable the mobile robot to move at a preset speed in a preset direction when it is detected that a distance between the mobile robot and the obstacle reaches a preset distance.

A second apparatus is configured to calculate a robot predicted moving space of the mobile robot in a next moving cycle based on the preset speed and the preset direction.

A third apparatus is configured to determine an adjusted speed and an adjusted direction of the mobile robot based on the robot predicted moving space, so as to make the mobile robot move in proximity to the obstacle at the adjusted speed in the adjusted direction.

In the present application, the device 1 may be the mobile robot itself or other control devices capable of controlling the mobile robot. In this embodiment, the mobile robot includes a device capable of automatically or passively controlling moving, e.g., a sweeping robot, a mopping robot and the like; and the obstacle includes an object capable of stopping the moving of the mobile robot.

When the mobile robot is moving, the first apparatus keeps detecting the distance between the mobile robot and the obstacle so as to enable the mobile robot to move along an outline of the obstacle when the mobile robot is in proximity to the obstacle. Here, ranging information with respect to the obstacle nearby may be obtained by a lidar, and the distance between the mobile robot and the obstacle may be obtained based on the ranging information. Here, the preset distance may be preset. The preset distance indicates that the mobile robot is close to but not in contact with the obstacle. A preset speed and a preset direction of the mobile robot when the mobile robot reaches the preset distance may be preset. The preset speed is an initial sampling speed of moving of the mobile robot when the mobile robot approaches the obstacle. The preset speed includes a linear speed and an angular speed. Here, it may be assumed that the mobile robot uses a largest linear speed and a largest angular speed as the preset speed. The preset direction is an initial moving direction of the mobile robot when the mobile robot approaches the obstacle. The preset direction may be preset to, e.g., leftwards or rightwards. When it is detected from an analysis of laser data that the distance between the mobile robot and the obstacle reaches the preset distance, the mobile robot moves at the preset speed in the preset direction.

The device 1 may further include a fourth apparatus (not shown) configured to enable the mobile robot to approach the obstacle at a current speed in a specified direction when the distance between the mobile robot and the obstacle is greater than the preset distance. In this embodiment, when the mobile robot is far away from the obstacle, the fourth apparatus may control the mobile robot to move at its current speed in a current direction since the mobile robot will not hit the obstacle. Here, the current speed of the mobile robot may be preset, or may be a moving speed that can be automatically adjusted by the mobile robot and can be used when the mobile robot is far from the obstacle. The specified direction may include a current moving direction of the mobile robot, and may further include a certain direction randomly set.

The device 1 may further include a fifth apparatus (not shown) configured to determine a target position in proximity to the obstacle according to acquired laser data when the distance between the mobile robot and the obstacle is greater than the preset distance, so as to make the mobile robot move towards a direction of the target position.

In this embodiment, when the mobile robot is far away from the obstacle, the fifth apparatus may determine a target position, which is a position for approaching the obstacle, according to the acquired laser data. The mobile robot may adjust speed and direction according to the target position so as to approach the target position. The target position may be a position nearest to the mobile robot currently in distance, i.e., the mobile robot may approach the obstacle by moving for a shortest distance.

Still in this embodiment, the second apparatus calculates the robot predicted moving space of the mobile robot in the next moving cycle based on the preset speed and the preset direction. Here, the moving cycle may be a preset sampling cycle. The robot predicted moving space of the mobile robot in the next moving cycle may be calculated through the sampling cycle, the preset speed and the preset direction. The robot predicted moving space is used for indicating position information of the mobile robot in the next moving cycle, and may be a position point or a position range.

Still in this embodiment, the third apparatus determines the adjusted speed and the adjusted direction of the mobile robot based on a positional relationship between the robot predicted moving space and the obstacle, so as to make the mobile robot move in proximity to the obstacle at the adjusted speed in the adjusted direction.

The third apparatus may be configured to determine, based on the robot predicted moving space, whether the obstacle is within the robot predicted moving space; and reduce, when the obstacle is within the robot predicted moving space, the preset speed by a preset speed increment and rotate by a preset angle increment according to the preset direction, so as to determine the adjusted speed and the adjusted direction.

In this embodiment, the third apparatus may use the acquired laser data to determine the distance between the mobile robot and the obstacle and a distance of the robot predicted moving space. Here, the robot predicted moving space may be position information of a point closest to the obstacle. The distance between the mobile robot and the obstacle and the distance to the robot predicted moving space are compared to determine whether the obstacle is within the robot predicted moving space. That is, such method can be used for calculating whether the mobile robot hits the obstacle in the next moving cycle.

When the obstacle is within the robot predicted moving space, the mobile robot will hit the obstacle and thus the moving speed and direction of the mobile robot needs to be adjusted. Here, as an adjusting mode, it is feasible to reduce the preset speed by the preset speed increment and rotate by the preset angle increment according to the preset direction, so as to determine the adjusted speed and the adjusted direction. Here, the preset speed increment may be a preset adjustment amount of the speed. The adjustment amount may be fixed or may vary according to actual situations. For example, when the possibility of a collision is high, the preset speed may be reduced by a larger amount, i.e., the absolute value of the preset speed increment is large; and when the possibility of the collision is small, the preset speed may be reduced by a smaller amount, i.e., the absolute value of the preset speed increment may be small. Meanwhile, to avoid collisions, it is also needed to adjust the mobile robot leftwards or rightwards by certain preset angular increment, so as to slightly change the moving direction of the mobile robot.

The third apparatus may further be configured to use the preset speed and the preset direction as the adjusted speed and the adjusted direction respectively when the obstacle is not within the robot predicted moving space.

In this embodiment, when the mobile robot does not hit the obstacle in the next moving cycle, the mobile robot continues moving according to the preset speed and the preset direction as initially approaching the obstacle. After moving for certain distance, a mobile robot predicted moving space in another moving cycle is further calculated according to the preceding mode, so as to enable the mobile robot to keep moving along the obstacle.

As compared to the related art, in the present application, the mobile robot moves at a preset speed in a preset direction when it is detected that a distance between the mobile robot and the obstacle reaches a preset distance; a robot predicted moving space of the mobile robot in a next moving cycle is calculated based on the preset speed and the preset direction; and an adjusted speed and an adjusted direction of the mobile robot are determined based on the robot predicted moving space, so as to make the mobile robot move in proximity to the obstacle at the adjusted speed in the adjusted direction. By such mode, a moving mode of the mobile robot can be flexibly adjusted according to environment changes so as to prevent the mobile robot from hitting the obstacle.

It will be apparent to those skilled in the art that the present disclosure is not limited to the details of the above exemplary embodiments, and that the present disclosure can be embodied in other forms without departing from the spirit or essential features of the present disclosure. Thus, embodiments of the present disclosure are illustrative and not restrictive. The scope of the present disclosure is defined by the appended claims rather than by the foregoing description and is therefore intended to cover all changes that fall within the meaning and scope of an equivalency of the claims. Reference numbers in the claims are not to be construed as limiting the claims. In addition, it is apparent that the word “comprise” or “include” does not exclude other units or steps and the singular does not exclude the plural. The multiple units or apparatuses described in the device claims may also be implemented by one unit or apparatus through software or hardware. The words such as “first” and “second” are used for indicating names and do not represent any particular order.

What is claimed is:

1. A method for a mobile robot to move in proximity to an obstacle, the mobile robot comprising a processor, the method comprising:

in a step A, moving, by the mobile robot, at a preset speed in a preset direction when it is detected that a distance between the mobile robot and the obstacle reaches a preset distance, wherein the preset distance indicates that the mobile robot is close to but not in contact with the obstacle, the preset speed is an initial sampling speed of moving of the mobile robot when the mobile robot approaches the obstacle, and the preset direction is an initial moving direction of the mobile robot as the mobile robot approaches the obstacle;

in a step B, calculating a robot predicted moving space of the mobile robot in a next moving cycle based on the preset speed and the preset direction, wherein the robot predicted moving space comprises position information of a point closest to the obstacle; and in a step C, determining an adjusted speed and an adjusted direction of the mobile robot based on a positional relationship between the robot predicted moving space and the obstacle, so as to make the mobile robot move in proximity to the obstacle at the adjusted speed in the adjusted direction and to move along an outline of the obstacle when the mobile robot is in proximity to the obstacle.

2. The method according to claim 1, before the step A, further comprising:

approaching the obstacle at a current speed in a specified direction when the distance between the mobile robot and the obstacle is greater than the preset distance.

3. The method according to claim 1, before the step A, further comprising:

determining, according to acquired laser data, a target position in proximity to the obstacle when the distance between the mobile robot and the obstacle is greater than the preset distance, so as to make the mobile robot move towards a direction of the target position.

4. The method according to claim 3, wherein the target position is a position nearest to the mobile robot currently in the distance.

5. The method according to claim 1, wherein the step C comprises:

determining, based on the robot predicted moving space, whether the obstacle is within the robot predicted moving space; and reducing, when the obstacle is within the robot predicted moving space, the preset speed by a preset speed increment and rotating by a preset angle increment according to the preset direction, so as to determine the adjusted speed and the adjusted direction.

6. The method according to claim 5, wherein the step C further comprises:

using the preset speed and the preset direction as the adjusted speed and the adjusted direction respectively when the obstacle is not within the robot predicted moving space.

7. A device for controlling a mobile robot to move in proximity to an obstacle, comprising:

a first apparatus, which is configured to enable the mobile robot to move at a preset speed in a preset direction when it is detected that a distance between the mobile robot and the obstacle reaches a preset distance, wherein the preset distance indicates that the mobile robot is close to but not in contact with the obstacle, the preset speed is an initial sampling speed of moving of the mobile robot when the mobile robot approaches the obstacle, and the preset direction is an initial moving direction of the mobile robot when the mobile robot approaches the obstacle;

a second apparatus, which is configured to calculate a robot predicted moving space of the mobile robot in a next moving cycle based on the preset speed and the preset direction, wherein the robot predicted moving space comprises position information of a point closest to the obstacle; and a third apparatus, which is configured to determine an adjusted speed and an adjusted direction of the mobile robot based on a positional relationship between the robot predicted moving space and the obstacle, so as to make the mobile robot move in proximity to the obstacle at the adjusted speed in the adjusted direction and to move along an outline of the obstacle when the mobile robot is in proximity to the obstacle.

8. The device according to claim 7, further comprising:

a fourth apparatus, which is configured to enable the mobile robot to approach the obstacle at a current speed in a specified direction when the distance between the mobile robot and the obstacle is greater than the preset distance.

9. The device according to claim 7, further comprising:

a fifth apparatus, which is configured to determine, according to acquired laser data, a target position in proximity to the obstacle when the distance between the mobile robot and the obstacle is greater than the preset distance, so as to make the mobile robot move towards a direction of the target position.

10. The device according to claim 9, wherein the target position is a position nearest to the mobile robot currently in the distance.

11. The device according to claim 7, wherein the third apparatus is configured to:

determine, based on the robot predicted moving space, whether the obstacle is within the robot predicted moving space; and reduce, when the obstacle is within the robot predicted moving space, the preset speed by a preset speed increment and rotate by a preset angle increment according to the preset direction, so as to determine the adjusted speed and the adjusted direction.

12. The device according to claim 11, wherein the third apparatus is further configured to:

use the preset speed and the preset direction as the adjusted speed and the adjusted direction respectively when the obstacle is not within the robot predicted moving space.

* * * * *